(12) United States Patent
Southard et al.

(10) Patent No.: US 12,209,044 B2
(45) Date of Patent: Jan. 28, 2025

(54) ADDITIVE MANUFACTURE OF OPTICAL COMPONENTS

(71) Applicant: Danbury Mission Technologies, LLC, Danbury, CT (US)

(72) Inventors: Bari M. Southard, Bridgewater, CT (US); Matthew J. East, Danbury, CT (US); Daniel E. Dunn, Bethel, CT (US); Kramer Harrison, Norwalk, CT (US)

(73) Assignee: Danbury Mission Technologies, LLC, Danbury, CT (US)

( * ) Notice: Subject to any disclaimer, the term of this patent is extended or adjusted under 35 U.S.C. 154(b) by 0 days.

(21) Appl. No.: 17/368,380

(22) Filed: Jul. 6, 2021

(65) Prior Publication Data
US 2022/0169550 A1 Jun. 2, 2022

Related U.S. Application Data

(63) Continuation of application No. 15/348,136, filed on Nov. 10, 2016, now abandoned.

(51) Int. Cl.
*C03B 19/01* (2006.01)
*B33Y 10/00* (2015.01)
(Continued)

(52) U.S. Cl.
CPC .............. *C03B 19/01* (2013.01); *B33Y 10/00* (2014.12); *B33Y 80/00* (2014.12); *C03B 19/06* (2013.01);
(Continued)

(58) Field of Classification Search
None
See application file for complete search history.

(56) References Cited

U.S. PATENT DOCUMENTS 5,076,700 A 12/1991 DeCaprio
5,249,785 A 10/1993 Nelson et al.
(Continued)

FOREIGN PATENT DOCUMENTS

EP 2840071 2/2015
JP 1999040054 A 2/1999
(Continued)

OTHER PUBLICATIONS

U.S. Appl. No. 15/348,194, filed Nov. 10, 2016, Harrison.
(Continued)

*Primary Examiner* — James M Mellott
(74) *Attorney, Agent, or Firm* — Fish & Richardson P.C.

(57) ABSTRACT

A method of forming an optical component includes depositing slurry that includes glass powder material onto a facesheet and fusing the glass powder material to a facesheet to form a first core material layer on the facesheet. The method also includes successively fusing glass powder material in a plurality of additional core material layers to build a core material structure on the facesheet. The method can include selectively depositing slurry including glass powder material over only a portion of at least one of the facesheet, the first core material layer, and/or the one of the additional core material layers. Depositing the slurry can include extruding the slurry from an extruder.

8 Claims, 3 Drawing Sheets

(51) Int. Cl.

| | |
|---|---|
| *B33Y 80/00* | (2015.01) |
| *C03B 19/06* | (2006.01) |
| *C03C 8/02* | (2006.01) |
| *C03C 17/04* | (2006.01) |
| *C03C 17/34* | (2006.01) |
| *C03C 23/00* | (2006.01) |
| *G02B 5/10* | (2006.01) |

(52) U.S. Cl.
CPC ............... *C03C 8/02* (2013.01); *C03C 17/04* (2013.01); *C03C 17/3417* (2013.01); *C03C 23/0025* (2013.01); *G02B 5/10* (2013.01); *C03B 2201/42* (2013.01); *C03C 2218/32* (2013.01); *C03C 2218/35* (2013.01)

(56) References Cited

U.S. PATENT DOCUMENTS

| | | | |
|---|---|---|---|
| 6,997,015 | B2 | 2/2006 | Bowden et al. |
| 8,789,390 | B2 | 7/2014 | Thomas et al. |
| 9,680,360 | B2 | 6/2017 | Schenk et al. |
| 2003/0226375 | A1 | 12/2003 | Bernas et al. |
| 2003/0226377 | A1 | 12/2003 | Barrett et al. |
| 2004/0121451 | A1 | 6/2004 | Moritz et al. |
| 2006/0179879 | A1 | 8/2006 | Ellison et al. |
| 2011/0072855 | A1 | 3/2011 | Matsumoto et al. |
| 2011/0088431 | A1 | 4/2011 | Matsumoto |
| 2014/0196502 | A1 | 7/2014 | Masuda et al. |
| 2014/0199494 | A1 | 7/2014 | Genier |
| 2015/0056415 | A1* | 2/2015 | Southard ................. C03B 19/01 428/161 |
| 2017/0120332 | A1* | 5/2017 | DeMuth ............... B23K 26/703 |
| 2020/0024465 | A1* | 1/2020 | Dylla-Spears ........... C09D 1/00 |

FOREIGN PATENT DOCUMENTS

| | | |
|---|---|---|
| JP | 2004004503 | 1/2004 |
| JP | 2005000797 | 1/2005 |
| JP | 2008037743 | 2/2008 |
| JP | 2013523598 | 6/2013 |
| JP | 2015105229 | 6/2015 |

OTHER PUBLICATIONS

EP Extended Search Report in European Appln. No. 17200865.8, dated Apr. 11, 2018, 7 pages.
JP Office Action in Japanese Appln. No. 2017216174, dated Dec. 8, 2021, 15 pages (with English Translation).
JP Office Action in Japanese Appln. No. 2017216174, dated Feb. 16, 2021, 10 pages (with English translation).
JP Office Action in Japanese Appln. No. 2017216174, dated Oct. 26, 2021, 16 pages (with English translation).
EP Extended Search Report in European Appln. No. 22168003.6, dated Mar. 14, 2023, 11 pages.
Office Action in Japanese Appln. No. 2022-109592, dated Aug. 4, 2023, 9 pages (with English translation).
Office Action in Japanese Appln. No. 2022-109592, dated Jan. 30, 2024, 4 pages (with English translation).

* cited by examiner

ADDITIVE MANUFACTURE OF OPTICAL COMPONENTS

RELATED APPLICATIONS

This application is a continuation of, and claims the benefit of, U.S. application Ser. No. 15/348,136, filed on Nov. 10, 2016, the entire contents of which are hereby incorporated by reference.

BACKGROUND OF THE INVENTION

1. Field of the Invention

The present disclosure relates to optics and additive manufacturing, and more particularly to additively manufacturing optics, e.g., from low expansion glass.

2. Description of Related Art

Conventional lightweight glass mirror substrates are generated with subtractive manufacturing, milling, grinding, polishing, or etching away material from a large glass boule. These processes can create a stiff, lightweight glass structure with a precisely shaped optical surface, which remains stable under thermal and mechanical loads. But because glass is fragile, it is challenging to manufacture many small, intricate features with these conventional processes, and such intricate features can be important to manufacturing lightweight optics.

The conventional techniques have been considered satisfactory for their intended purpose. However, there is an ever present need for improved manufacturing of glass optics such as mirror substrates. This disclosure provides a solution for this problem.

SUMMARY OF THE INVENTION

A method of forming an optical component includes depositing slurry including glass powder material onto a facesheet and fusing the glass powder material to a facesheet to form a first core material layer on the facesheet. The method also includes successively fusing glass powder material in a plurality of additional core material layers to build a core material structure on the facesheet.

The method can include positioning the facesheet on a mandrel prior to fusing glass powder material to the facesheet. Fusing glass powder material to the facesheet can include fusing the glass powder material to a polishable surface of the facesheet. At least one of depositing slurry including glass powder material and successively fusing glass powder material in a plurality of additional core material layers can include selectively depositing slurry including glass powder material over only a portion of at least one of the facesheet, the first core material layer, and/or the one of the additional core material layers. Depositing the slurry can include extruding the slurry from an extruder. Fusing glass powder material can include fusing low expansion glass powder into low expansion glass, e.g., with a laser. Fusing glass powder material can include fusing low expansion titania-silica glass powder into low expansion titania-silica glass. Fusing glass powder material to a facesheet can include fusing glass powder material to a facesheet that is contoured for optical properties.

Successively fusing glass powder material can include forming a mirror substrate. Forming a mirror substrate can include forming an optimal three-dimensional mirror topology that minimizes the mass of mirror substrate while providing a level of stiffness and stability above a predetermined minimum requirement. Successively fusing glass powder material can include varying material properties in successive layers and/or varying material properties based on position in the successive layers.

An optical component includes a glass facesheet. A first layer of low expansion glass is fused to the glass facesheet. A plurality of successively fused layers form a core material structure on an assembly that includes the facesheet and the first layer.

The facesheet can be contoured for optical properties in at least one of two-dimensions or three-dimensions. The facesheet can include a polishable surface, wherein the first layer is fused to the polishable surface of the facesheet. The first layer and the plurality of successively fused layers can include fused low expansion glass powder material, e.g., low expansion titania-silica glass powder. The facesheet, first layer, and successively fused layers can form a mirror substrate. The mirror substrate can include an optimal three-dimensional mirror topology that minimizes the mass of mirror substrate while providing a level of stiffness and stability above a predetermined minimum requirement. The plurality of successively fused layers can include glass material with material properties that vary in successive layers and or that vary based on position within the core material structure.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
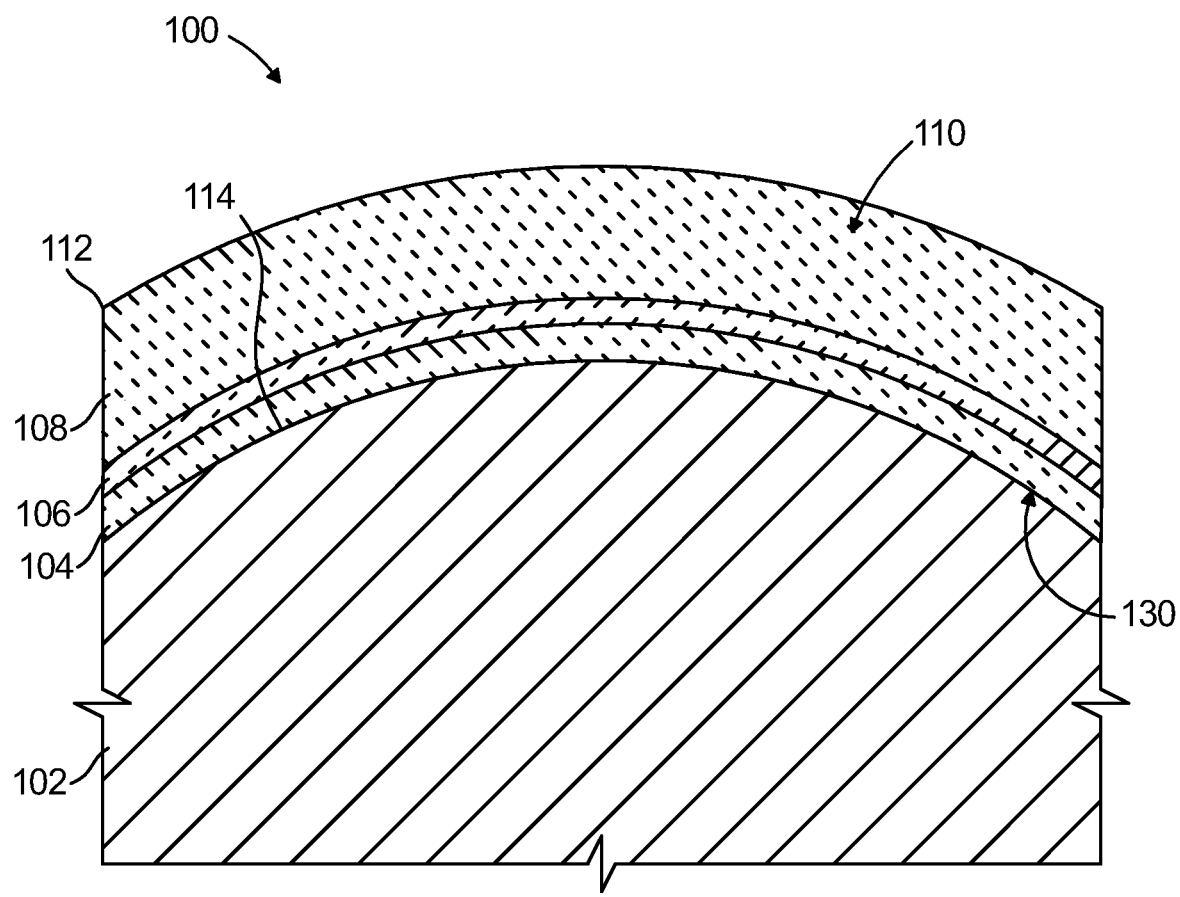
FIG. 1 is a schematic side elevation view of an exemplary embodiment of a mirror substrate constructed in accordance with the present disclosure, showing the mandrel and the facesheet with successive layers of additively manufactured core material structure deposited on the facesheet.

Reference will now be made to the drawings wherein like reference numerals identify similar structural features or aspects of the subject disclosure. For purposes of explanation and illustration, and not limitation, a partial view of an exemplary embodiment of an optical component in accordance with the disclosure is shown in FIG. 1 and is designated generally by reference character 100. Other embodiments of optical components in accordance with the disclosure, or aspects thereof, are provided in FIGS. 2-3, as will be described. The systems and methods described herein can be used to additively manufacture optical components such as mirror substrates from low thermal expansion glass.

FIG. 1 shows an optical component 100, e.g., a mirror substrate, on a mandrel 102. A method of forming the optical component 100 includes positioning a preformed glass facesheet 104 on the mandrel 102. The facesheet 104 can be made of titania-silica glass, can be relatively thin, and is contoured for optical properties, e.g. two- or three-dimensionally contoured to provide a desired or predetermined mirror contour. A glass powder material is fused to a polishable surface 114 of the facesheet 104 to form a first core material layer 106 on the facesheet 104. Glass powder material is then successively fused in a plurality of additional core material layers 108 to build a core material structure 110 on the facesheet 104. The final layer 112 is fused at the surface of core material structure 110 opposite the facesheet 104 from the first layer 106. The facesheet 104 becomes part of the finished optical component 100.

Figure 2:
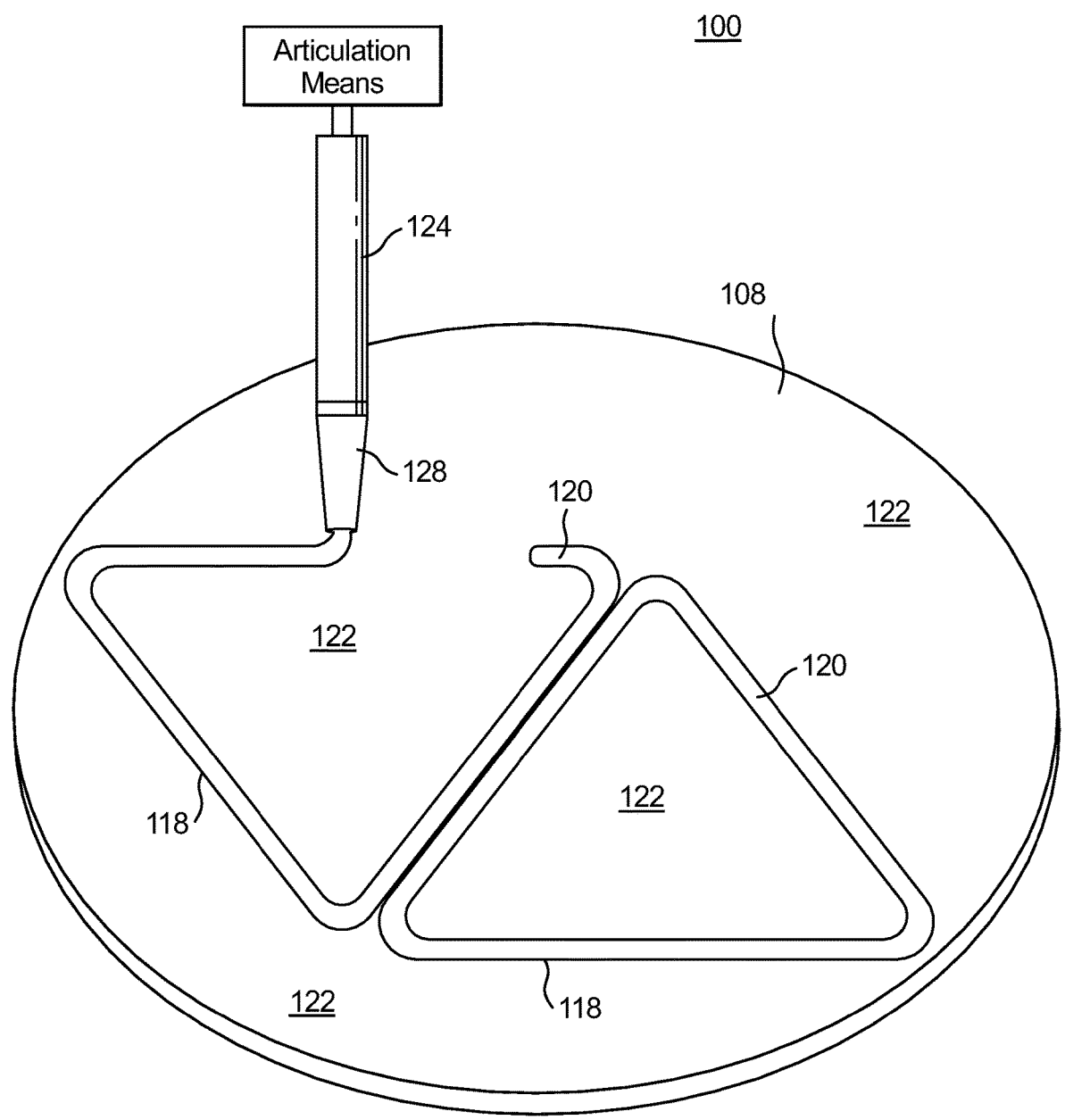
FIG. 2 is a schematic perspective view of the mirror substrate of FIG. 1, showing the extruder selectively depositing a slurry of glass powder material.

With reference now to FIG. 2, the method includes depositing liquid slurry that includes the glass powder material using an articulated extruder 124 to deposit the slurry onto the polishable surface 114 of the facesheet 104. Extruder 124 is articulated by conveyor system 126 for selectively depositing the slurry over only a portion of at least one of the facesheet 104, the first core material layer 106, and/or the one of the additional core material layers 108. In other words, extruder 124 extrudes slurry onto the top most surface of the assembly 115 that includes facesheet 104, the first core material layer 106, and/or one or more of the additional core material layers 108, as oriented in FIGS. 1-2. The slurry can include the glass powder material suspended in a liquid gel, water, or suitable fluid for extrusion through nozzle 128 for precise selective depositing or printing onto the assembly 115. After the slurry is deposited, it can be dried to leave behind a dried powder of the glass material ready for fusing to the assembly 115. The glass powder material can be configured to form a low expansion glass material when the powder is fused, for example, low expansion titania-silica glass powder can be fused into low expansion titania-silica glass.

Figure 3:
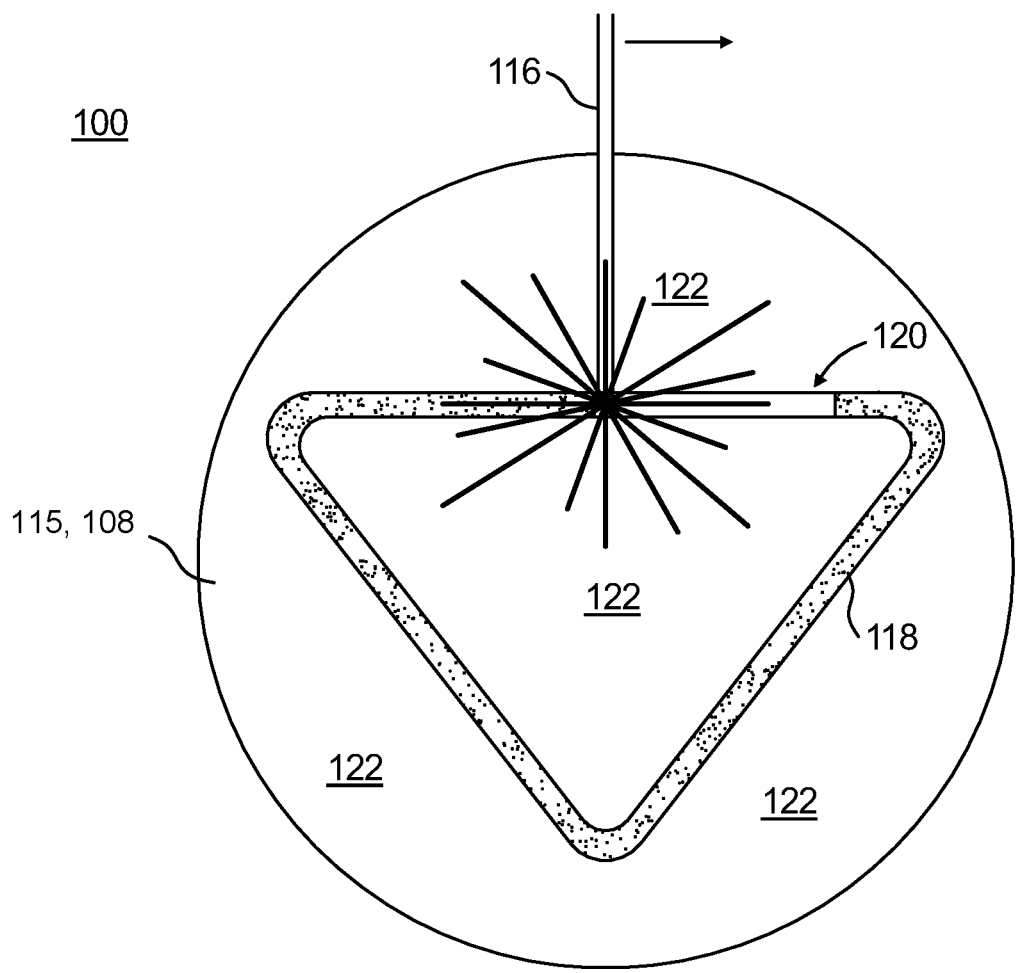
FIG. 3 is a schematic plan view of the mirror substrate of FIG. 1, showing a laser beam fusing the powder material.

Referring now to FIG. 3, each such layer of powder is fused to the assembly 115 to form the cross-section of the desired geometry into the core material structure 110. The fusion can be achieved by using a laser beam 116. In FIG. 3, the laser beam 116 is shown schematically fusing the portion 118 of the deposited powder covering assembly 115 to form a layer of fused glass only in the triangle shape shown. The direction of movement of laser beam 116 around the pattern of the triangle is indicated by the large arrow in FIG. 3. The portion 120 of the powder that is about to be fused by laser beam 116 is shown schematically in FIG. 3. Mechanical abrasion grinding can optionally be used to prepare the assembly 115 after fusing a given layer prior to depositing the slurry for the next layer, e.g., to ensure that the fused layer is uniform in thickness.

This technique allows for forming a mirror substrate, or other optical component, with an optimal three-dimensional topology that minimizes the mass of mirror substrate while providing a level of stiffness and stability above a predetermined minimum requirement. Successively fusing layers as described herein can include fusing glass powder material so as to vary material properties in successive layers and/or varying material properties based on position in a given layer. For example, the triangular portion 118 in FIG. 2 can be formed of glass with a first set of material properties, and the remaining portions 122 of the surface of assembly 115 can be formed of a glass with a second set of material properties so that a given layer 108 has different sets of material properties within itself as a function of location within that layer 108.

Unlike conventional additive manufacturing, where a part is printed on a build plate and later removed therefrom, the facesheet 104 serves as a build plate and also becomes part of the finished product. As a finishing process, the final layer 112 and or opposite surface 130 of the face sheet 104 shown in FIG. 1 can be polished and coated.

The methods and systems of the present disclosure, as described above and shown in the drawings, provide for optical components with superior properties potentially including very intricate features, optimal three-dimensional geometric topologies, including amorphous topologies with smaller more intricate features than can be reliably produced using conventional techniques, to minimize mass, e.g., of mirror substrates, while achieving required stiffness and stability for given applications and loads. It is also possible to provide quicker fabrication of low expansion glass using techniques disclosed herein, compared to conventional techniques, and it is possible to make larger glass mirror substrates than in convention techniques. With respect to allowing making larger glass mirror substrates than are possible with conventional techniques using build plates, this stems from the fact that under conventional techniques, the high temperatures of additive manufacturing can case thermal stresses during manufacture that warp a part and can cause it to peel off from the build-plate. This peeling process limits how large a component can be manufactured under conventional additive manufacturing techniques, but it is not a limitation for techniques disclosed herein. The thermal expansion behavior and visco-elastic behavior of titania-silica glass at high temperatures is a key enabler of larger additively manufactured structures. The fusing of the additively manufactured layers to the build plate is another key enabler of larger additively manufactured structures.

While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of forming an optical component comprising:
    forming a build plate comprising a facesheet attached to a mandrel that is contoured to match the facesheet; and
    forming successive layers of a core material structure on the facesheet by depositing a slurry comprising a glass powder material onto the core material structure, and fusing the glass powder material to the core material structure,
    wherein a composite layer of the core material structure has a uniform thickness and is formed by:
        depositing a first slurry comprising a first glass powder material onto only a portion of the core material structure, drying the first slurry, and heating the first glass powder material to form a first portion of the composite layer comprising a first glass material fused to the core material structure; and
        after drying and heating the first glass powder material, depositing a second slurry comprising a second glass powder material different from the first glass powder material onto a remaining portion of the core material structure, drying the second slurry, and heating the second glass powder material to form a second portion of the composite layer comprising a second glass material fused to the core material structure to complete the composite layer so that the composite layer has different sets of material properties within itself as a function of location within the composite layer.

2. The method of claim 1, wherein the first and second slurries are deposited by extruding the first and second slurries from an extruder.

3. The method of claim 1, wherein the first and second slurries are fused by exposing the slurries to laser radiation.

4. The method of claim 1, wherein the facesheet is contoured for optical properties.

5. The method of claim 1, wherein following formation of the core material structure, the core material structure comprises a three-dimensional geometric topology.

6. The method of claim 1, wherein the first slurry comprises the first glass powder material suspended in a liquid gel, and wherein the second slurry comprises the second glass powder material suspended in a liquid gel.

7. The method of claim 1, further comprising mechanically abrading the composite layer prior to forming a further layer of the core material structure.

8. The method of claim 1, wherein at least one optical property of the first glass powder material is different from the second glass powder material.

* * * * *